United States Patent [19] [11] 4,269,613
Miko et al. [45] May 26, 1981

[54] REUSABLE DISC FILTER WITH FOIL SPACERS FOR HIGH TEMPERATURE GASES

[75] Inventors: Richard J. Miko, Paramus, N.J.; Daniel H. Shapiro, Roslyn Heights, N.Y.

[73] Assignee: Edo Corporation, College Point, N.Y.

[21] Appl. No.: 20,486

[22] Filed: Mar. 14, 1979

[51] Int. Cl.³ .............................................. B01D 46/40
[52] U.S. Cl. ................... 55/278; 55/385 R; 55/492; 55/522; 89/1 B; 102/530
[58] Field of Search ............... 55/267, 278, 492, 522, 55/525, 529, 385 R, 490; 89/1 B; 102/39; 210/488

[56] References Cited

U.S. PATENT DOCUMENTS

| 1,793,583 | 2/1931 | Bowden | 55/278 X |
| 2,330,945 | 10/1943 | Becker | 55/278 UX |
| 2,619,188 | 11/1952 | Haw et al. | 55/525 X |
| 2,973,833 | 3/1961 | Cook | 55/497 |
| 3,152,988 | 10/1964 | Gutkowski et al. | 210/488 X |
| 3,513,633 | 5/1970 | Glorvig | 55/278 X |
| 3,912,458 | 10/1975 | Fukuma et al. | 55/267 X |
| 4,033,226 | 7/1977 | Craigie | 89/1 B X |
| 4,137,847 | 2/1979 | Osborne | 102/39 |

FOREIGN PATENT DOCUMENTS

393022 12/1908 France ..................... 55/278

OTHER PUBLICATIONS

Jones, J. I., *Part 2—High Temperature Resistant Fibres from Organic, Polymeric Precursors*, In Filtration & Separation, 7(3): p. 303, May/Jun. 1970.

*Primary Examiner*—Kathleen J. Prunner
*Attorney, Agent, or Firm*—Davis, Hoxie, Faithfull & Hapgood

[57] ABSTRACT

A reusable filter to remove contaminants from high temperature gases, in excess of 4500° F., developed by burning propellants and used to do work such as actuation of piston-powered devices in aircraft store ejector racks. Contaminants are removed to prevent fouling of the device being acted upon, to increase reliability and to decrease maintenance of the device. The filter has alternating stacked metal discs and foil spacers to permit side entry of the gas. The discs and spacers are made of molybdenum, columbium or tantalum. A plurality of studs pass through the discs and spacers to align and hold the filter together. Each spacer has a plurality of extended peripheral portions extending toward the circumference of the adjacent discs to define filter gaps. Each disc has a plurality of flow openings communicating with the filter gaps and aligned with the openings of the other discs to allow axial gas flow along the filter for end exit. The discs and spacers are sufficient in size and number to provide adequate filtering capability and absorb heat to prevent melting, but are not so large as to remove excess heat from the gas upstream from where the gas does its work. Filtering gaps in an axial direction between adjacent discs may be of the order of a few microns to a few hundred microns.

9 Claims, 3 Drawing Figures

REUSABLE DISC FILTER WITH FOIL SPACERS FOR HIGH TEMPERATURE GASES

BACKGROUND OF THE INVENTION

The invention described herein may be manufactured and used by or for the Government of the United States of America for governmental purposes without the payment of any royalties thereon or therefor.

The invention relates to a filter that may be reused many times without damage to remove dirt and other contaminants from high temperature gases generated by burning propellants, and thus prevent the contaminants from fouling movable members exposed to the gas.

Present day military aircraft of high performance capability require external stores to be displaced from the aircraft at high velocity in order for the stores to properly leave the aircraft flow field without damage. This is generally accomplished by ejector racks, missile launchers and the like, using explosive cartridges that create high temperature gases as an energy source. The high temperature gases act on piston actuated devices that in turn eject the stores at the desired high velocity. The propellants burnt in conventional cartridges generate gases of a temperature in excess of 4500° F. Unburnt propellant, residue from igniters, oxides from the cartridge cases, and erosion of the breech all create particles which act to ultimately foul the ejector rack piping and the ejector guns or the like.

In the past, the residue of these particles has been removed by periodic disassembly and cleaning of the rack and the like, which is costly and affects operational availability of the rack. On the other hand, the failure to carry out periodic cleaning affects reliability, since the residue buildup can cause the rack to fail to operate properly. Various solutions to this problem have been sought, including attempts to arrive at a clean burning cartridge that does not provide contaminants, and attempts to design a filter to remove the contaminants from the high temperature gas path before the gas acts on the piston actuated devices. A sufficiently clean burning cartridge is yet to be developed, and filters that may be reused through a large number of operational cycles have not been satisfactorily obtained because of the destructive effects of the high gas temperature on the filter.

SUMMARY OF THE INVENTION

The present invention consists of a reusable filter for high temperature gases which will collect the residue from the gas and thereby provide cleaner gas to a piston actuated device such as found in an ejector rack, missile launcher or the like. The device operation will then be more reliable, and will result in a need for less maintenance than present systems. The filter is constructed with particular materials and a particular design configuration so as to withstand, without ablation or erosion, gas temperatures of over 4500° F. A hot gas filter thereby may be obtained which will be reusable in bomb racks, guns and the like through many firings, without jamming or fouling of the piston actuated devices and without the need for maintenance. The present invention utilizes filter components made from either molybdenum, columbium or tantalum, which have sufficiently high melting points in relation to the hot gas generated. The filter also is designed with sufficiently large mechanical disc components to provide adequate heat sinks to prevent melting, which disc components are mechanically spaced to provide fine slots to capture the contaminants. The components, however, must not be so large as to cool the gas too much and dissipate its energy before the gas reaches the point where it is to act as an energy source; the components must also be sufficiently small to fit within the intended working environment of an aircraft or missile. The design must also be of sufficient size to provide maximum filtering capacity without excessive pressure drop in the gas.

The invention may also have applicability where the hot gases from burning propellants are used to actuate devices or drive mechanisms such as in gyroscopes in a missile, or to provide thrust in a missile to change its path, it being desired in the former instance that contaminants in the gas not foul the gyroscope and in the latter instance that contaminants in the gas not foul control valves through which the gas passes.

DESCRIPTION OF EMBODIMENT

Figure 1:
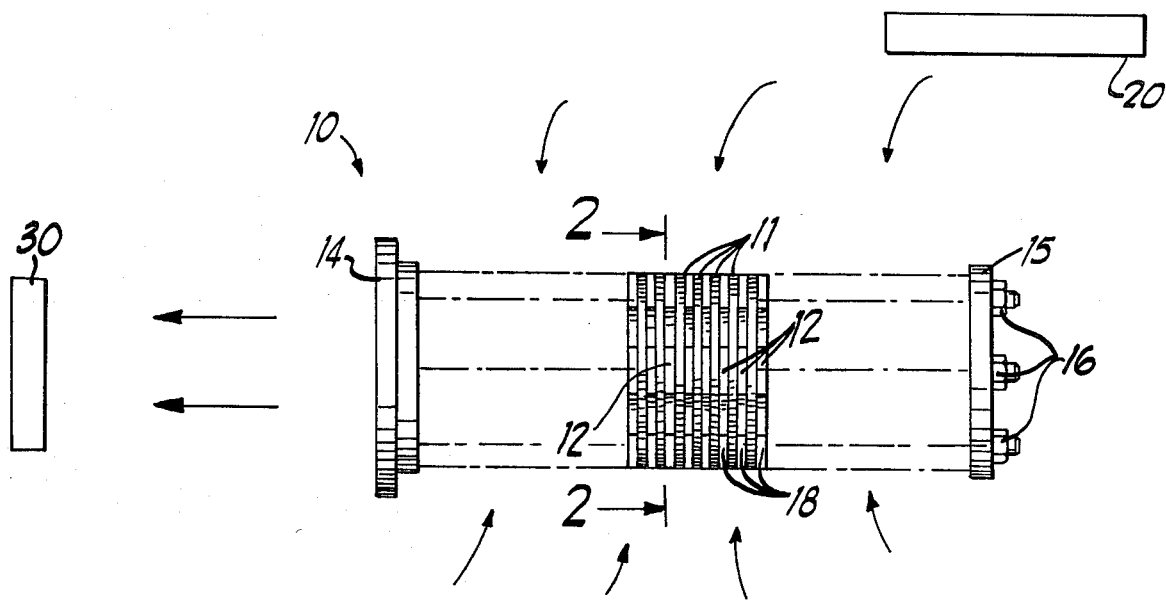
FIG. 1 is a side elevational view of the filter of the present invention, also illustrating the gas flow from a burning cartridge into and out of the filter to a movable member exposed to the gas.
Figure 2:
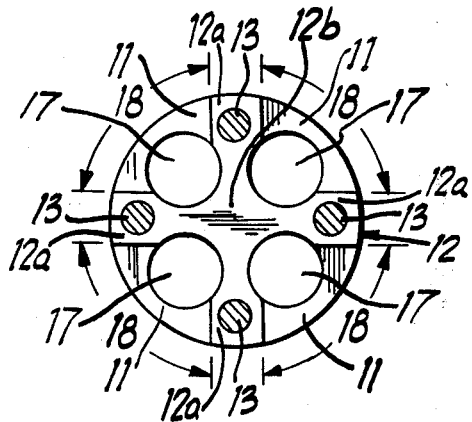
FIG. 2 is a cross-sectional view of the filter taken along lines 2—2 of FIG. 1.

Referring now to the drawings, hot gas filter 10 of the present invention has a generally cylindrical outer shape. Filter 10 is formed by a large number, in the order of over a hundred for example, of alternating stacked flat discs 11 and flat foil spacers 12 which are aligned and secured together by four studs 13 which pass through the discs 11 and spacers 12, and are secured to end flange 14 and closed cap 15 of filter 10 as by nuts 16. Each disc 11 has four flow openings 17 which are aligned with the four corresponding openings in the other discs 11. Each spacer 12 extends at four peripheral portions 12a from the imperforate central portion 12b of the spacer toward the circumference of its axially adjacent discs 11 to provide rigidity to the filter and to accurately establish the axial spacing between adjacent discs 11 from one end to the other of filter 10. The four studs 13 respectively pass through the four peripheral portions 12a of each foil spacer 12, to accurately maintain the position of the spacer.

As diagramatically illustrated in FIG. 1, the hot gas from burning cartridge 20 flows to a movable member in the form of a piston-actuated device 30 of an aircraft store ejector rack by passing through filter 10. The gas enters through the sides of filter 10 through the gas flow slots 18 defined by the axial spacing between adjacent discs 11 established by foil spacers 12, and by the circumferential distances between the extended peripheral portions 12a of the spacers 12. The high temperature gas passes radially inwardly of the filter through the gas flow gaps 18 along the filter, and then into the four disc openings 17 in communication with the slots 18 to in turn move axially along the filter toward the exit end at flange 14, cap 15 generally being a closed surface.

Figure 3:
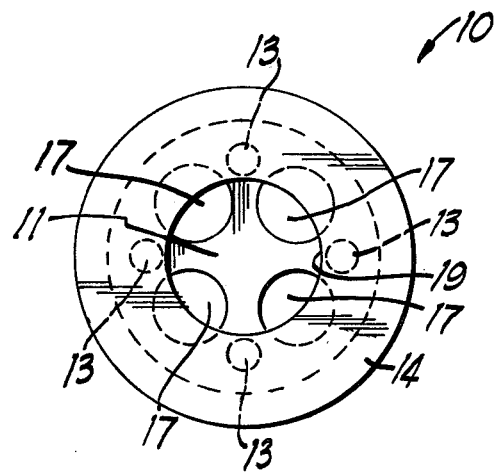
FIG. 3 is an end elevational view of the filter of FIG. 1, at its exit end.

Referring to FIG. 3, flange 14 has a discharge port 19, from which the filtered hot gas exits to thereafter activate movable member 30 or drive some other mechanical device such as in a gyroscope or to pass through a control valve. Discharge port 19 overlaps a portion of each of the four openings 17 through which the high temperature gas is flowing, in order to allow stud placement on the flange, but the degree of overlap is not such as to significantly impede the gas flow.

By virtue of passing through the filter, contaminant particles are eliminated from the high temperature gas by being captured at the gas flow slots 18 by virtue of the narrow axial distance between adjacent discs 11. This axial distance defined by the thickness of foil spacers 12 may vary from a few microns to a few hundred microns, by way of example, depending on the filtering action desired.

The studs 13, flange 14, cap 15 and nuts 16 may be constructed of corrosion resistant steel, since they are not excessively exposed to hot gas flow. Discs 11 and foil spacers 12, however, must be constructed of a material with a sufficiently high melting point so that the hot gas of a temperature in excess of 4500° F. will not cause melting as it passes over these parts. Molybdenum, columbium or tantalum may be used for the discs 11 and foil spacers 12 in a filter according to the design of the present invention.

The size of the discs and spacers of the filter must be such as to absorb sufficient heat to prevent melting, but not excessive so as to overly cool the gas before it reaches the point beyond the filter when the gas is to serve as an energy source and do work. The filter should have sufficient filtering capacity so that the gas is not subjected to a large pressure drop in passing through the filter. The aircraft or missile environment in which the filter has application also dictates a small size and weight of filter. The discs 11 generally will be several times thicker than the foil spacers 12 establishing the gas flow slots into the filter, and a large number of alternating discs 11 and spacers 12 will be utilized to obtain sufficient filtering action. Openings 17 must be sufficient in number and size to avoid obstructing the flow of gas inside the filter toward the discharge port 19. In an experimental filter for an ejector rack, for example, having one hundred and thirty-five molybdenum discs 11 and one hundred and thirty-four molybdenum foil spacers 12 over an axial filter length of approximately three inches, the discs 11 were one inch in diameter, four openings 17 were each approximately 0.3 inches in diameter, and filter slots 18 were of approximately 50 microns in axial length. The discs 11 were each approximately 500 microns in thickness. Coarser or finer filter gaps may be established by varying the thickness of spacers 12.

It should be understood that modification of the present invention may be made without departing from the spirit and scope of the invention as hereinafter claimed.

What is claimed is:

1. A hot gas filter to remove contaminants from a gas stream generated by a burning propellant and having a gas temperature in excess of 4500° F., the filter to be capable of surviving numerous exposures to the hot gas without damage and to be used in a system between the burning propellant and a movable member downstream of the filter to reliably prevent fouling of the downstream member after numerous exposures to the hot gas, said filter comprising: a plurality of axially-aligned flat discs; a plurality of axially aligned flat foil spacers; each disc being spaced from an adjacent disc by a foil spacer to establish filter gaps between the edges of the discs; a cap at one end of the aligned discs and spacers; a flange with an opening at the other end of the aligned discs and spacers; a plurality of studs attached to the cap and flange to hold the filter together, the studs passing through the respective discs and foil spacers to maintain their position in the filter; each disc having a plurality of flow openings in communication with the said filter gaps and aligned and in communication with the respective flow openings in the other discs; the flange opening overlapping at least a portion of each of the aligned flow openings in the discs; and the flat discs and spacers both being comprised of a metal capable of withstanding the high temperature gas without melting.

2. The invention defined in claim 1, wherein the metal comprising the discs and foil spacers is molybdenum.

3. The invention defined in claim 1, wherein the metal comprising the discs and foil spacers is columbium.

4. The invention defined in claim 1, wherein the metal comprising the discs and foil spacers is tantalum.

5. The invention defined in claim 1, wherein each spacer has a plurality of extended peripheral portions spaced from one another and extending toward the circumference of the adjacent discs; wherein the filter gaps are established between adjacent discs and adjacent extended peripheral portions of the intervening spacer; and, wherein each filter gap is open to one of the flow openings in each disc.

6. The invention defined in claim 5, wherein the studs respectively pass through the extended peripheral portions of each spacer.

7. The invention defined in claim 6, wherein there are four flow openings in each disc, four studs, and four extended portions of each spacer, the four studs respectively passing through the four extended portions of each spacer.

8. The invention defined in claim 5, wherein the discs and spacers are of a number and size to provide adequate filtering, absorb sufficient heat to avoid melting, and remove minimum energy from the gas being filtered.

9. The invention defined in claim 1, wherein the movable member downstream of the filter comprises a piston-actuated device of an aircraft store ejector rack.

* * * * *